Nov. 13, 1956 W. G. SCHINSKE 2,770,154
ADJUSTABLE BITE WIRE STRIPPERS
Filed June 15, 1953
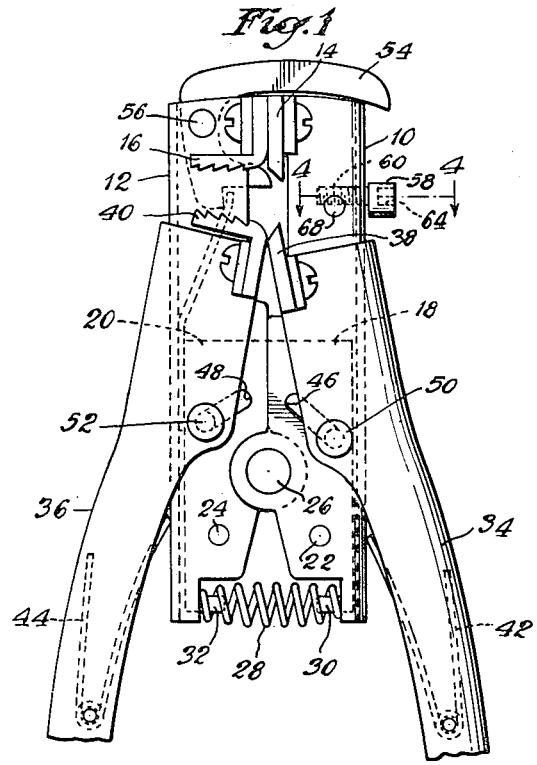
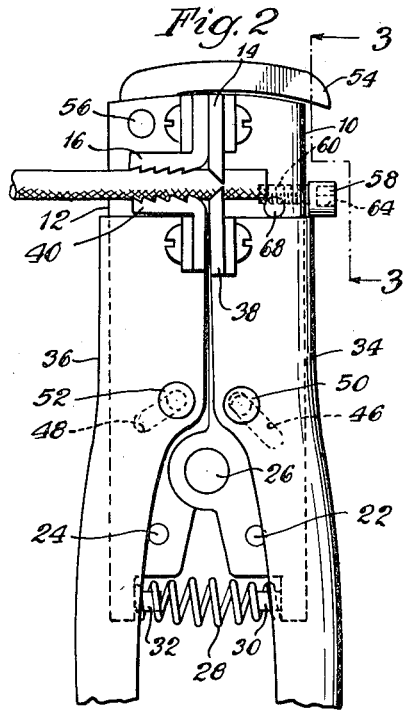
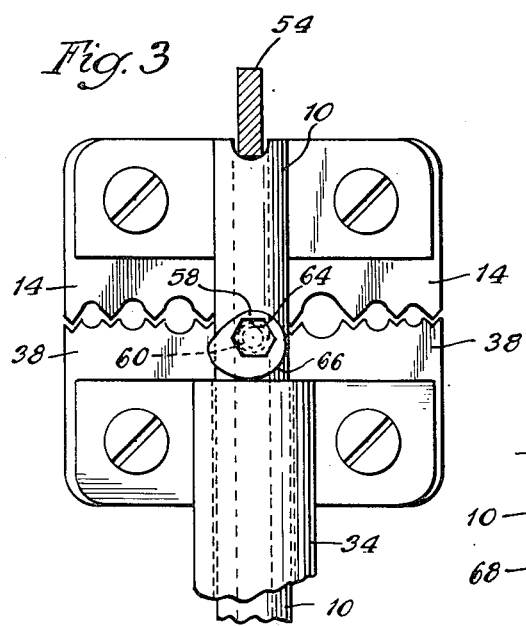
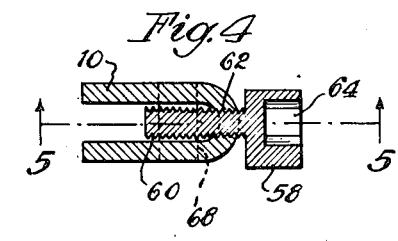
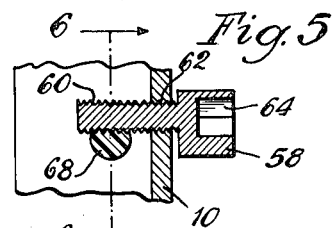
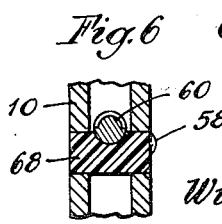
Inventor
William G. Schinske
by Parker & Carter
Attorneys United States Patent Office 2,770,154
Patented Nov. 13, 1956

2,770,154
ADJUSTABLE BITE WIRE STRIPPERS

William G. Schinske, Sycamore, Ill., assignor to Ideal Industries, Inc., Sycamore, Ill., a corporation of Delaware Application June 15, 1953, Serial No. 361,689

3 Claims. (Cl. 81—9.5)

My invention resides in the field of hand tools for stripping the insulation from electrical wires and the like so that they can be easily and quickly spliced or connected to any type of suitable electric fitting. More specifically, my invention is a new and improved wire stripper hand tool adapted to strip the insulation from an electric wire without nicking or cutting the metal of the wire.

A primary object of my invention is a new and improved wire stripping tool with insulation clamping and stripping jaws and means for regulating and adjusting the depth that the stripping jaws cut into the insulation during a stripping operation.

Another object of my invention is an improved, manually operable wire stripping tool with opposable insulation cutting and stripping jaws, one fixed and the other movable, and manually adjustable means for varying the approach of the movable jaw to the fixed jaw so that the jaws will only cut or bite into the insulation and will not nick or bite into the metal wire.

Another object of my invention is a new and improved hand tool of the above type which can be accurately adjusted to accommodate it to the size of wire desired to be stripped of insulation.

Other objects will appear from time to time in the ensuing specification and drawings in which:

Figure 1 is a side view of a conventional wire stripper hand tool embodying my invention, the stripper being shown with its clamping and stripping jaws open;

Figure 2 is a view similar to Figure 1 except that the clamping and stripping jaws of the wire stripper tool are closed and engaging a wire positioned between them;

Figure 3 is a sectional view on an enlarged scale taken along line 3—3 of Figure 2;

Figure 4 is a sectional view on an enlarged scale taken along line 4—4 of Figure 1;

Figure 5 is a sectional view taken along line 5—5 of Figure 4; and

Figure 6 is a sectional view taken along line 6—6 of Figure 5.

I have shown my invention in the drawings as applied to a wire stripper hand tool similar to the one shown and described in Patent No. 2,179,581, and reference is made to that patent for the basic structure and operation of such a hand tool.

This hand tool is composed of a pair of opposed jaw carriers 10 and 12 which have stripping jaws 14 and clamping jaws 16 secured respectively to flanges at their upper end. These clamping and stripping jaws are on both sides of the jaw carriers and it should be understood that they could be on only one side if desired. The jaw carriers are U-shaped in cross section as shown in Figure 4 and have filler strips 18 and 20 disposed within the channel of their U-shaped configuration and these parts are secured by any suitable means such as the rivets 22 and 24 adjacent their lower end. The jaw carriers and filler strips are pivoted together at 26 by any suitable pivot means and the upper ends of the jaw carriers having the stripping and clamping jaws are biased toward each other by a spring 28 or the like disposed below the pivot between the lower ends of the jaw carriers and filler strips. The filler strips are provided with lugs or projections 30 and 32, respectively, which enter the ends of the spring to retain and position it between the ends of the jaw carriers.

A pair of handles 34 and 36, respectively, each having a U-shaped cross section at its upper end, overlie the jaw carriers and are adapted to move longitudinally up and down the jaw carriers in a reciprocating manner during a stripping operation. These handles are broken off in Figures 1 and 2 as they are conventional. The upper end of handle 34 carries a stripper blade 38 which opposes the other stripper blade 14, while the other handle 36 carries a clamping jaw 40 opposing its mating clamping jaw 16. A pair of suitable springs 42 and 44, mounted in each of the handles bias them outwardly and downwardly to the inoperative position shown in Figure 1. The movements of the handles are defined by a pair of diagonally disposed slots 46 and 48 in the jaw carriers and filler strips, and suitable pins 50 and 52 carried by the handles pass through and ride in these slots.

In Figure 1 the handles are shown in their inoperative position with the pins 50 and 52 in the lower extremities of the slots 46 and 48, while in Figure 2 the handles have been closed, the pins 50 and 52 have risen upwardly and inwardly to the top of the slots, and the clamping and stripping jaws closely approach each other and coact with a wire disposed between them.

A locking dog 54 pivoted to one of the jaw carriers at 56 is adapted to prevent the jaw carriers from moving toward each other immediately upon release of the handles so that the stripped wire will not be crushed or bent by the closing stripping jaws. As this particular feature forms no part of the present invention and is conventional, it will not be described in detail.

One of the disadvantages of this type of hand stripping tool is that the stripping jaws are adapted to close until the pin 50 engages the upper extremity of the slot 46 during the upward movement of the handle 34. In Figure 3, it will be observed that various sized openings are provided in the stripping jaws so that the tool can be used with a variety of wire sizes. In certain types of work a high degree of accuracy in the jaws is required because it has been found that the jaws will approach each other too closely before the upward movement of the lower jaw 38 is stopped by the pin 50 engaging the upper end of the slot 46, and the stripping jaws, in addition to cutting or biting through the insulation, will slightly nick or cut the metal of the wire. This slight nick or cut is unimportant when the wire will be used in a stationary installation. However, there are certain types of jobs where the wires will be subjected to vibration. One example of this is in the aircraft industry, and when two wires have been spliced together and either one or both of the wires have been slightly nicked during the stripping operation, this nick will serve as a point of stress concentration and during continuous vibration the wire will eventually rupture at this spot. As stated above, this nicking problem may not be important in a stable installation. However, in any type of work where a connection of this type is subjected to vibration, the wires cannot be nicked or they will eventually break.

The upper limit of movement of the lower stripping jaw is fixed by the upper end of the slot 46 and the pin 50 and can not be varied. If nicking of the wires occurs during the stripping operation, the hand tool will be useless in the aircraft industry, for example, and I have provided means for varying or regulating the approach of the lower stripping jaw to the upper stripping jaw so that if nicking occurs, the jaws can be spread farther apart in their closed position and the nicking or cutting will be eliminated.

This means includes an abutment 58 which has a threaded shank 60 mounted in a suitable threaded opening 62 in the U-shaped channel of the jaw carrier 10. The abutment is provided with a suitable socket 64 and I have shown this socket as being hexagonal in shape for the reception of a well-known Allen wrench. However, the abutment could be provided with a simple slot so that it could be turned by a conventional screw driver or the like and the invention should not be restricted to any particular means for rotating the abutment. As shown in Figure 3, the abutment has a cam surface 66 and in any position it defines the upper position of movement of the handle 34 and the abutment will regulate the upper position of the stripper jaw 38.

Therefore, if the operator of the tool finds that the stripper jaws are cutting into the wire during a stripping operation, he simply rotates the abutment 58 slightly so that the stripper jaws will be spread farther apart during the final stripping operation.

To prevent the abutment pin from unauthorizedly turning after it has once been set, I have positioned a plastic plug or insert 68 through the sides of the U-shaped jaw carrier 10 in the path of the shank 60 of the abutment pin as shown in Figure 5. Specifically, I use nylon for this pin as it has a tendency to return to its former shape and will hold the abutment tightly against rotation. However, a large number of plastics would probably perform equally as well.

From the above it can be seen that the operator of the tool can prevent the stripper jaws 14 and 38 from approaching each other too closely and he can prevent nicking and cutting of the wires. If at any time the operator desires to enlarge all of the openings between the stripper jaws, as shown in Figure 3, to accommodate the tool to larger size wires, he has merely to rotate the abutment pin until a larger portion of the abutment is disposed downwardly toward the handle lever and the stripper jaws in their final cutting or stripping position will be spread wider apart.

Whereas I have described my invention as applied to a conventional hand-operated wire stripping tool, it should be understood that this is done only for purposes of illustration and the essence of the invention could easily be applied to any one of a number of wire stripping tools now on the market. The particular hand-operated stripping tool shown has clamping and stripping jaws on both sides of the jaw carriers and it should be understood that these jaws could be on only one side without departing from the invention. Additionally, such a device could be power-operated. However, in the majority of cases, a hand tool is preferable. The variable surface 66 on the abutment pin could have any shape and configuration and it could have a series of flat surfaces spaced around its periphery to establish predetermined positions or stations. Even though I have shown the surface 66 similar to an involute, these and many other changes will be obvious and could easily be made in the structure without departing from the invention and I desire that my invention be unrestricted except by the appended claims.

I claim:

1. In a hand tool for stripping insulation from a wire, a pair of opposed jaw carriers pivoted together, a pair of handle members pivotally mounted on the jaw carriers, one of the jaw carriers and its handle member having longitudinally opposed clamping jaws, the other jaw carrier and its handle member having longitudinally opposed stripping jaws, resilient means for biasing the pivoted jaw carriers so that the jaws come together, and a variable abutment between the said other jaw carrier and its handle member and on one of them to regulate the distance that the stripping jaw on the handle member can move toward the stripping jaw on the jaw carrier, said abutment being disposed so as to be effective between the pivot and the stripping jaw on the jaw carrier, said variable abutment being disposed on said other jaw carrier and adapted to engage its handle member, said variable abutment having a stem threaded into said other jaw carrier, and a plastic pin mounted in said other jaw carrier in engagement with the threaded stem so as to prevent accidental movement of the abutment.

2. In a hand tool for stripping insulation from a wire, a pair of opposed jaw carriers pivoted together, a pair of U-shaped handle members overlying said jaw carriers and longitudinally movable thereon a limited distance, one jaw carrier and its handle member having longitudinally opposed clamping jaws thereon, the other jaw carrier and its handle member having longitudinally opposed stripping jaws, resilient means for biasing the pivoted jaw carriers so that the jaws come together, and a variable abutment between said other jaw carrier and its handle member and on one of them to regulate the distance that the stripping jaw on the handle member can move toward the stripping jaw on the jaw carrier, said abutment being disposed so as to be effective between the pivot and the stripping jaw on the jaw carrier, said variable abutment being disposed on said other jaw carrier and adapted to engage the forward edge of its handle member, said abutment having a stem threaded into said other jaw carrier through the base of the U-shaped section, and a plastic pin mounted on said other jaw carrier in engagement with said threaded stem so as to prevent accidental movement of the abutment.

3. The structure of claim 2 wherein the material of the pin is nylon.

References Cited in the file of this patent

UNITED STATES PATENTS

| | | |
|---|---|---|
| 1,566,297 | Williams | Dec. 22, 1925 |
| 1,578,438 | Hintz | Mar. 30, 1926 |
| 1,592,142 | Laubscher | July 13, 1926 |
| 2,179,581 | Voogd | Nov. 14, 1939 |

FOREIGN PATENTS

| | | |
|---|---|---|
| 379,934 | Italy | Apr. 13, 1940 |
| 501,294 | Belgium | Feb. 28, 1951 |